(12) United States Patent
Kang et al.

(10) Patent No.: US 10,666,105 B2
(45) Date of Patent: May 26, 2020

(54) WIRE ASSEMBLY FOR ROTARY ELECTRIC MACHINE AND CORRESPONDING METHOD TO OBTAIN THE WIRE ASSEMBLY

(71) Applicant: VALEO ELECTRICAL SYSTEMS KOREA LTD., Gyeongsangbuk-do (KR)

(72) Inventors: Taewook Kang, Gyeongsangbuk-do (KR); Heewook Seo, Gyeongsangbuk-do (KR); Sangshin Lee, Gyeongsangbuk-do (KR); Jaechul Lee, Gyeongsangbuk-do (KR); Sangwook Lee, Gyeongsangbuk-do (KR)

(73) Assignee: Valeo Electrical Systems Korea Ltd., Gyeongsangbuk-do (KR)

( * ) Notice: Subject to any disclaimer, the term of this patent is extended or adjusted under 35 U.S.C. 154(b) by 516 days.

(21) Appl. No.: 15/501,918

(22) PCT Filed: Aug. 7, 2015

(86) PCT No.: PCT/KR2015/008272
§ 371 (c)(1),
(2) Date: Feb. 6, 2017

(87) PCT Pub. No.: WO2016/021974
PCT Pub. Date: Feb. 11, 2016

(65) Prior Publication Data
US 2017/0229936 A1    Aug. 10, 2017

(30) Foreign Application Priority Data

Aug. 7, 2014 (KR) .................. 10-2014-0101741

(51) Int. Cl.
*H02K 3/28* (2006.01)
*H02K 3/48* (2006.01)
(Continued)

(52) U.S. Cl.
CPC .................. *H02K 3/28* (2013.01); *H02K 3/12* (2013.01); *H02K 3/48* (2013.01); *H02K 15/066* (2013.01)

(58) Field of Classification Search
CPC ........... H02K 3/28; H02K 3/48; H02K 15/066
(Continued)

(56) References Cited

U.S. PATENT DOCUMENTS 6,459,187 B1   10/2002   Oohashi et al.
10,389,199 B2 *  8/2019   Langlard
(Continued)

FOREIGN PATENT DOCUMENTS

EP       0803962 A1    10/1997
JP     2002330572 A    11/2002
(Continued)

*Primary Examiner* — Hanh N Nguyen
(74) *Attorney, Agent, or Firm* — Berenato & White, LLC (57) ABSTRACT

The invention relates to a wire assembly for electric rotary machine comprising a plurality of phase coils (P1-P6), each phase coils (P1-P6) being aimed to be inserted in a dedicated set of slots (18) of a stator (10), each phase coil (P1-P6) comprising a first part (61) having an input (I1-I6) and a second part (62) having an output (O1-O6), the first part (61) and second part (62) constituting a distributed wave winding, wherein each phase coil (P1-P6) comprises a U-turn part (63) linking the first (61) and the second (62) parts so that each phase coil (P1-P6) is composed of a single wire (23).

13 Claims, 9 Drawing Sheets

(51) Int. Cl.
*H02K 15/06* (2006.01)
*H02K 3/12* (2006.01)

(58) Field of Classification Search
USPC .................................... 310/179, 180, 184
See application file for complete search history.

(56) References Cited

U.S. PATENT DOCUMENTS

2004/0119362 A1  6/2004 Neet
2004/0261256 A1* 12/2004 Sadiku ................ H02K 15/066
                                                      29/732
2010/0259124 A1 10/2010 Bodin et al.

FOREIGN PATENT DOCUMENTS

JP           2013208038 A    10/2013
WO      WO2009016157 A1      2/2009

* cited by examiner

WIRE ASSEMBLY FOR ROTARY ELECTRIC MACHINE AND CORRESPONDING METHOD TO OBTAIN THE WIRE ASSEMBLY

CROSS-REFERENCE TO RELATED APPLICATIONS AND CLAIM TO PRIORITY

This application is a national stage application of International Application No. PCT/KR2015/008272 filed Aug. 7, 2015, which claims priority to Korean Patent Application No. 10-2014-0101741 filed Aug. 7, 2014, the disclosures of which are incorporated herein by reference and to which priority is claimed.

FIELD OF THE INVENTION

The present invention relates to a wire assembly for rotary electric machine and corresponding method to obtain the wire assembly. The invention may be used with rotary electric machine consisting for example of an alternator or an electric motor.

BACKGROUND OF THE INVENTION

Rotary electric machine comprises a stator and a rotor mounted on a shaft. The electric machine comprises a casing carrying the stator. The shaft of the rotor is linked in rotation to the casing for example by means of ball bearings.

The rotor comprises a core formed by a stack of flat metal plates. The rotor comprises poles formed for example by permanent magnets positioned within cavities realized in the magnetic mass of the rotor, as it is described in document EP0803962. Alternatively, in a so-called salient poles architecture, the poles are formed by coils wound around arms of the rotor.

Furthermore, the stator comprises a core constituted by a stack of flat metal plates and a stator winding. The stator winding comprises a plurality of phase coils of the type in which each phase coil consists of conductors which are arranged in slots of the core associated with the phase, forming overall a spiral coaxial to an axis of the core. The winding therefore consists of a set of turns of the phase coils radially superimposed. Each phase coil comprises end-loop portions positioned alternatively on each side of the stator. Those end-loop portions establish a link between straight portions positioned inside the slots of the stator.

To improve the performance of the electric machine, it is preferable to fill the slots of the core to the maximum, while optimizing the flow sections of the magnetic flux. To this end, document U.S. Pat. No. 6,459,187 teaches the realization of a same layer of conductors. However, because of the high number of wires (at least two wires per phase, i.e 12 wires in total for a six phases winding), the coupling of the different phase coils between them is difficult to perform.

SUMMARY OF THE INVENTION

The invention aims to remedy to the drawbacks of the existing machine by providing a wire assembly for electric rotary machine comprising a plurality of phase coils, each phase coils being aimed to be inserted in a dedicated set of slots of a stator, each phase coil comprising a first part having an input and a second part having an output, said first part and second part constituting a distributed wave winding, characterized in that each phase coil comprises a U-turn part linking the first and the second parts so that each phase coil is composed of a single wire.

By limiting the number of wire for each phase coil to only one, the invention facilitates the coupling between the phase coils.

According to a particular embodiment, the wire of each phase coil comprises: a plurality of straight portions aimed to be inserted into the slots of the stator, and a plurality of end-loop portions linking the straight portions, said end-loop portions linking a plurality of consecutive straight portions being positioned in a same layer of conductors.

According to a particular embodiment, in the first and second parts of each phase coil, a given straight portion is linked to two adjacent straight portions disposed on two opposite sides of the given straight portion.

According to a particular embodiment, in the U-turn part, the straight portion is linked to two straight portions positioned on the same side through end-loop portions.

According to a particular embodiment, in the U-turn part, a straight portion comprises a slope portion.

According to a particular embodiment, the slope portion is inclined in a thickness direction of the wire assembly.

According to a particular embodiment, a length of the wire assembly is equal to N times the circumference of the stator, N being at least equal to two.

According to a particular embodiment, there is a transversal offset between the first and the second parts of a phase coil.

The invention also relates to a method for forming a wire assembly comprising:
the step of installation of a wire inside a series of slots of a linear support for each phase coil,
each phase coil comprising a first part having a input and a second part having an output, said first part and second parts constituting a distributed wave winding,
the step of pressing the wires of the phase coils,
characterized in that the step of installation comprises a step of forming a U-turn part by turning around a last slot for said phase coil and overlapping the straight portion positioned inside the slot preceding said last slot by another straight portion.

According to a particular embodiment, the straight portion positioned inside said last slot is preformed to have a slope portion prior to the step of installation.

According to a particular embodiment, the step of pressing the wires is made phase coil by phase coil or for all the phase coils together after their assembly on the linear support.

Other aspect of the invention will become apparent by consideration of the detailed description and accompanying drawings.

BRIEF DESCRIPTION OF THE DRAWINGS

FIG. 5b shows a segmented part constituting the female and the male dies of the embodiment of FIG. 5a;

In the description which follows, identical, similar, or like elements will be designated by the same reference numbers.

DETAILED DESCRIPTION OF THE PREFERRED EMBODIMENT(S)

Figure 1:
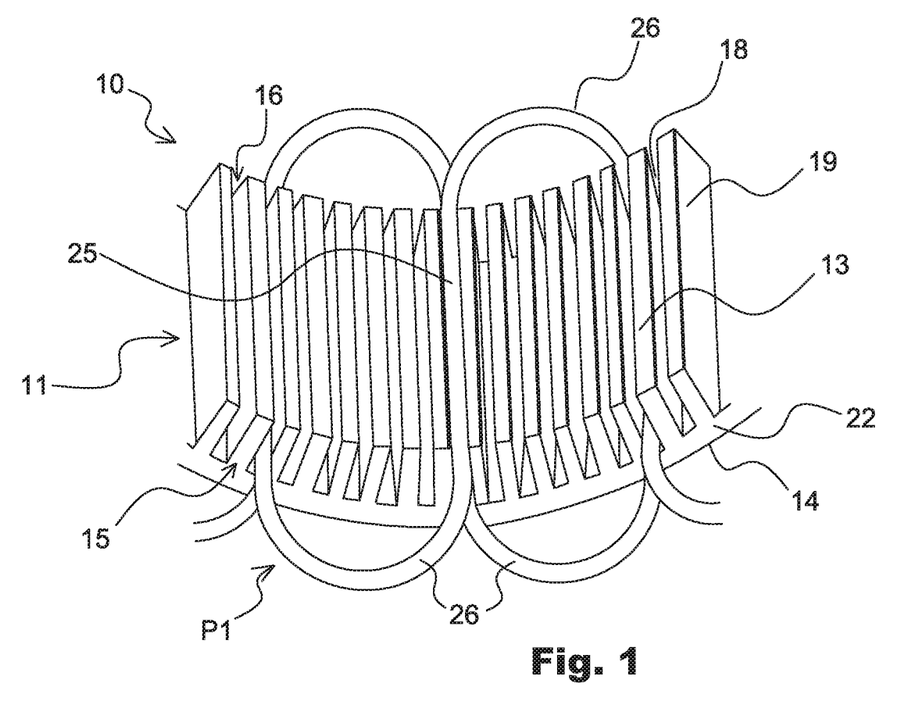
FIG. 1 is a partial perspective view of the interior of a stator in which a phase coil is arranged in accordance with the invention.

FIG. 1 shows a partial view of a stator 10 for an electric rotary machine which mainly comprises a core 11 in which are assembled several phase coils P1 P6, of which only one phase coil P1 has been illustrated here. Moreover, the core 11 is configured in such a manner that it is capable of receiving six similar phase coils P1-P6.

The rotary machine is for example an alternator or a starter-alternator. This machine is preferably intended to be used in a motor vehicle. It is pointed out that a starter-alternator is an electric rotary machine able to work in a reversible way, on the one hand as an electric generator functioning as an alternator, and on the other hand as an electric motor, in particular for starting the combustion engine of the motor vehicle.

Figure 2:
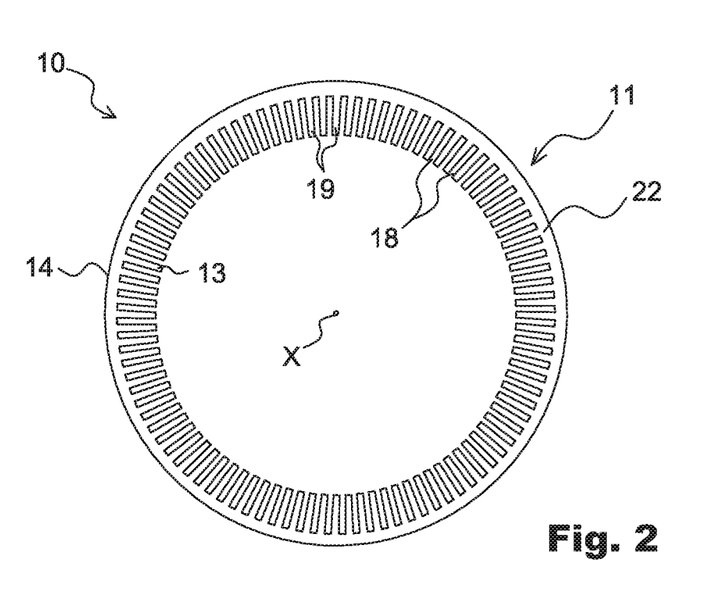
FIG. 2 is an top view of the stator core illustrated in FIG. 1.

As it can be seen in FIG. 2, the core 11 is of an annular cylindrical form having an axis X and consists of an axial stack of flat metal plates.

The core 11 is delimited radially by an internal cylindrical face 13 and by an external cylindrical face 14, and is delimited axially by a radial face at an axial lower end 15 and by a radial face at an axial upper end 16.

The core 11 comprises axial slots 18 which open out axially into the radial faces of axial lower end 15 and axial upper end 16 of the core 11. The slots 18 also open out radially into the internal cylindrical face 13 of the core 11. Slots 18 are all identical. The slots 18 are distributed in a regular manner angularly around the axis X of the core 11. Each slot 18 is defined by two consecutive teeth 19. Preferably, the core 11 does not comprise tooth foot in order to facilitate the insertion of the phase coils inside the slots 18.

The full external annular portion 22 of the core 11 into which slots 18 do not extend, is called the yoke.

In order to form the stator 10, several phase coils P1-P6 are installed in the core 11. The invention will be described with reference to a stator 10 comprising six phase coils P1-P6. The number of slots 18 may be equal to 36, 48, 60, 72, 84, or 96. In the present embodiment, the stator 10 comprises 96 slots. The invention is however applicable to stators comprising a different number of phase coils, and in particular stators comprising three phase coils. The stator core 11 then comprises for example 36, 48, or 72 slots.

Each phase coils P1-P6 comprises rippled turns, formed by electrical wires 23, which are piled up radially, as explained in more detailed hereafter. The wires 23 have preferably a rectangular cross section in order to maximize the filing of the slots 18. FIG. 1 shows only two turns of a phase coil P1, it being understood that each phase coils P1-P6 may comprise a greater number of turns.

Each phase coil P1-P6 comprises a series of straight portions 25 which are received in a series of associated slots 18. Each phase coil P1-P6 also comprises end-loop portions 26 with overall transverse orientation, which connect the consecutive straight portions 25 of the phase coils, and which extend alternately above the face of axial upper end 16 and below the face of axial lower end 15.

Slots 18 of a series of slots receive the straight portions 25 of the phase coils P1-P6. Each series of slots 18 is associated with one of the six phase coils P1-P6. Two consecutive slots 18 of a series of slots are separated by adjacent slots 18, each corresponding to another series of slots associated with one of the other five phase coils.

Thus, for a six-phases stator 10 as is the case in the present embodiment, five adjacent slots 18 are left free between two slots 18 of each series. In other words, the wire of a given phase coil is inserted in a slot out of six adjacent slots 18. Thus, for a stator 10 comprising N phase coils, the straight portions of a turn of a phase coil are received in a slot out of N adjacent slots.

Subsequent figures show apparatus for implementing the method for building up the stator 10. In a first step shown at FIGS. 3a-3c, a wire 23 is formed by using a forming tool 31 comprising an upper jig 32 and a lower jig 33. Each jig 32, 33 comprises a plurality of male dies 34 and female dies 35 positioned alternatively. A male die 34 of one jig 32, 33 cooperates with a female die 35 of another jig 32, 33 to form an end-loop portion 26.

Figure 3A:
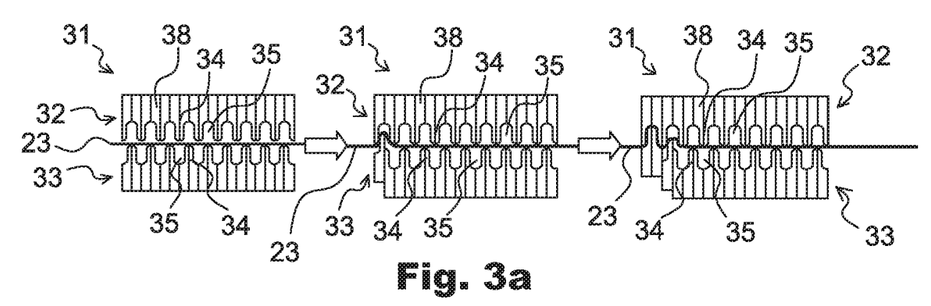
FIGS. 3a-3c show difference sequences of activation of a forming tool according to the invention for forming the wires of the phase coils.
Figure 3B:
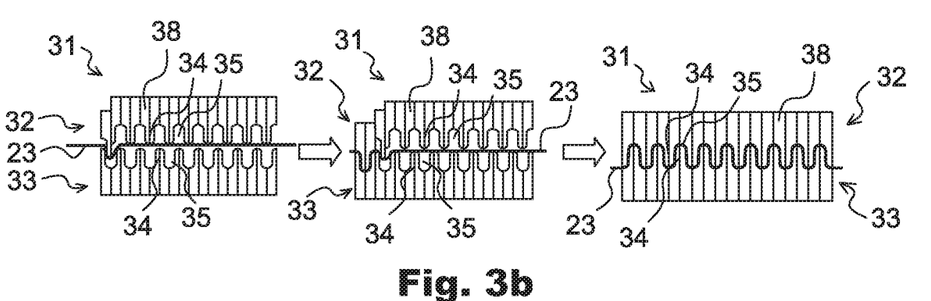
Figure 3C:
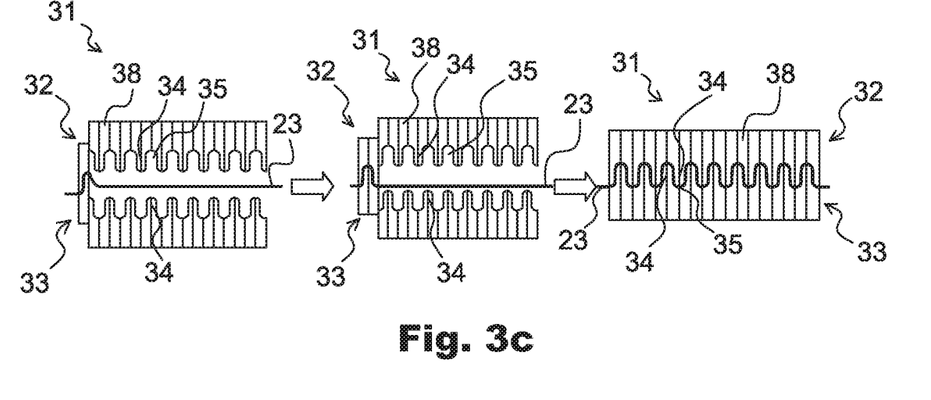

The male dies 34 are curved in the extremity forming the end-loop portion 26 with no straight zone. Correspondingly, the female dies 35 are curved in the extremity forming the end-loop portion 26 with no straight zone.

Figure 4:
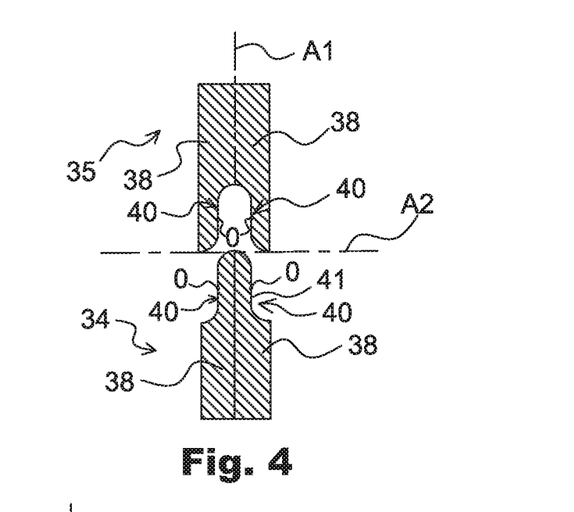
FIG. 4 illustrates a first embodiment of the male and corresponding female dies of the jigs of the forming tool according to the invention.
Figure 5A:
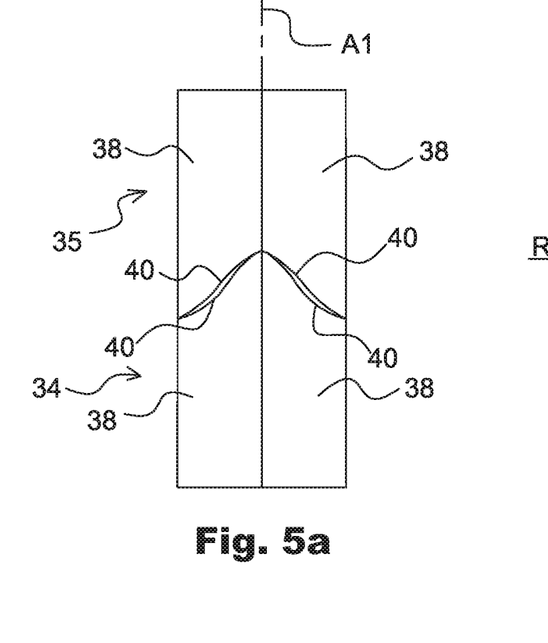
FIG. 5a illustrates a second embodiment of the male and corresponding female die of the jigs of the forming tool according to the invention.

As it can be seen in FIGS. 4 and 5a, each male die 34 is segmented in two parts 38 and each female die 35 is segmented in two parts 38. The parts 38 of the female die 35 and the male die 34 have all the same shape 40 comprising an inflection point O at which the curvature of the shape changes.

Figure 5B:
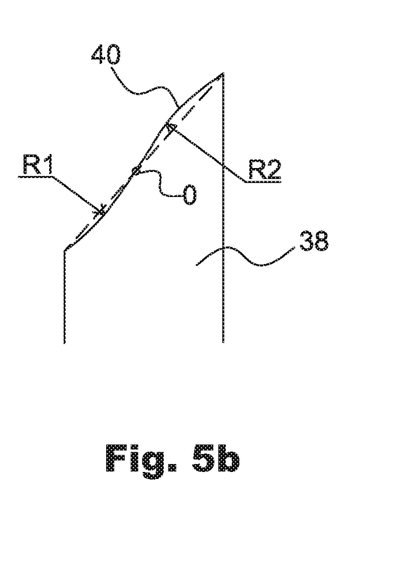

In the embodiment of FIG. 4, the shape 40 comprises a straight zone 41 extending between the curve portions. In the embodiment of FIG. 5a, the shape 40 comprises a bigger radius R1 and a smaller radius R2 with no straight zone. A ratio between the big radius R1 and the small radius R2 is preferably higher than 1.2. The dotted line shown on FIG. 5b corresponds to a virtual straight line.

In each male 34 or female 35 die, the two parts 38 are symmetrically positioned with regard to a vertical axis A1. Also, for each couple comprising a male 34 and a female 35 dies, the two parts 38 of one die 34, 35 are rotated around a horizontal axis A2 with regard to the two parts 38 of the other die 34, 35. In other word, the male die 34 and the female die 35 can be built up by means of identical parts 38 that are combined together in order to obtain the different dies 34, 35.

The parts 38 of the upper 32 and/or the lower 33 jigs are linearly slidable with regard to each other. In the embodiment of FIG. 3a, the parts 38 of the lower jig 33 are displaced toward the upper jig 32 which is not mobile. In the embodiment of FIG. 3b, the parts 38 of the upper jig 32 are linearly slidable toward the lower jig 33 which is not mobile. In the embodiment of FIG. 3c, the parts 38 of the upper 32 and the lower 33 jigs are alternatively displaced in direction of each other.

The male 34 and the female 35 dies are spaced with each other of a distance substantially equal to a width of the wire 23 after the tool 31 has been activated.

The forming tool 31 allows to obtain a wire 23 having a sinusoidal shape which is going to be used to form one of the phase coils P1-P6 as it is explained hereafter. The wire 23 comprises end-loop portions 26 which are completely round with no straight zone. The fact that only segmented parts 38 of the male 34 and/or the female 35 dies are successively displaced during the process allows to facilitate the removal of the jigs 32, 33 without damaging the wire 23.

The method for building up the stator 10 comprises a step of installation of the wires on a linear support 45 in order to form a wire assembly 44 corresponding to a linear development of the phase coils P1-P6.

Figure 6:
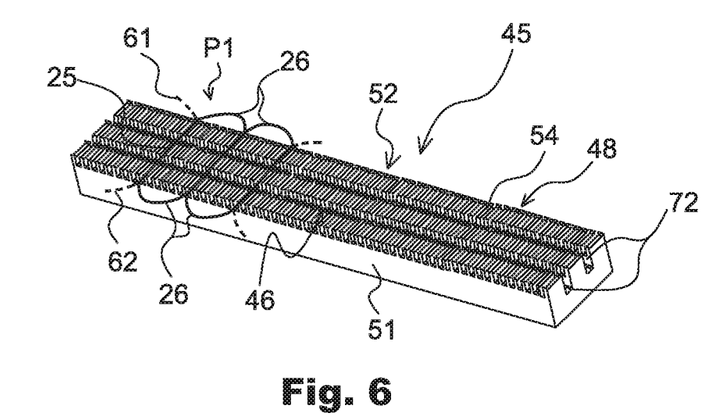
FIG. 6 is a perspective view of a linear support for implementing the steps of installation of the phase coils.

As it can be seen in FIG. 6, the upper face 46 of the linear support 45 comprises transverse slots 48 which open out transversely into the lateral faces 51, 52 and which are distributed longitudinally according to a constant pitch along the linear support 45. Those slots 48 correspond to the slots of the stator core 11 and are each defined by two adjacent teeth 54.

Figure 7:
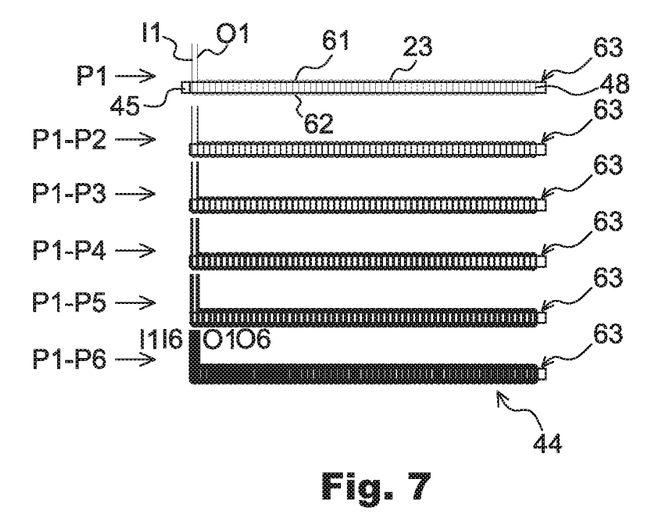
FIG. 7 shows the different steps of installation of the phase coils onto the linear support of FIG. 6.

As it is shown on FIG. 7, the phase coils P1-P6 are successively installed onto the linear support 45. This means that the first phase coil P1 associated to a first set of slots 48 is installed on the linear support 45. After the first phase coil P1 has been installed into the slots 48, the second phase coil P2 is installed, and so on until the six coil phases P1-P6 are installed onto the linear support 45. The method preferably comprises the step of pressing the wires 23 either phase coil by phase coil (this means that the method has a pressing step after each phase coil P1-P6 is installed onto the linear support 45); or for all the phase coils P1-P6 together after their assembly on the linear support 45.

Figure 8:
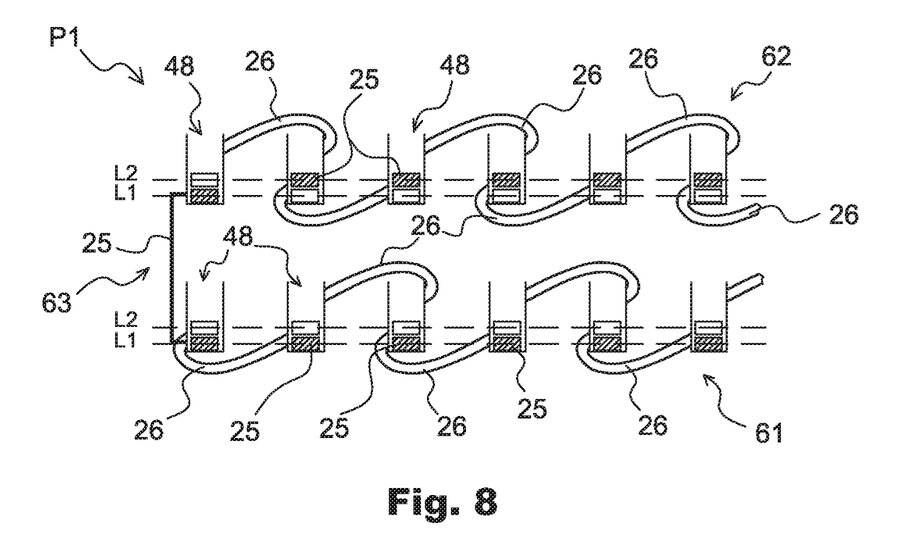
FIG. 8 is a linear development of the wire forming a phase coil showing the position of the two parts of the wire relative to each other.
Figure 10A:
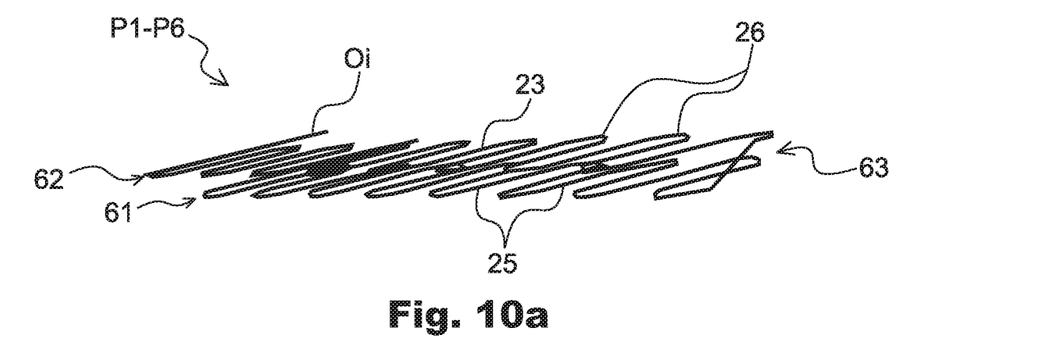
FIGS. 10a, 10b and 10c show respectively a perspective view, a side view, and a top view of a phase coil consisting of a single wire.
Figure 10B:
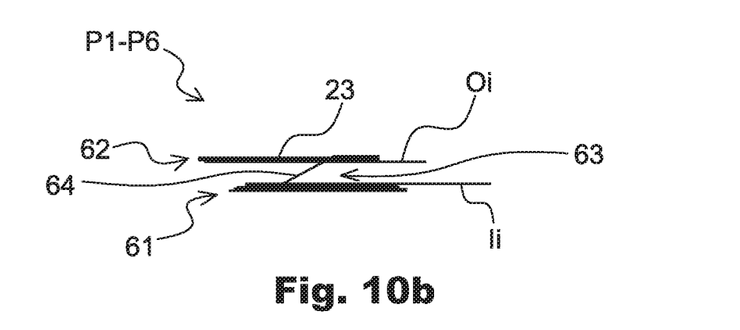
Figure 10C:
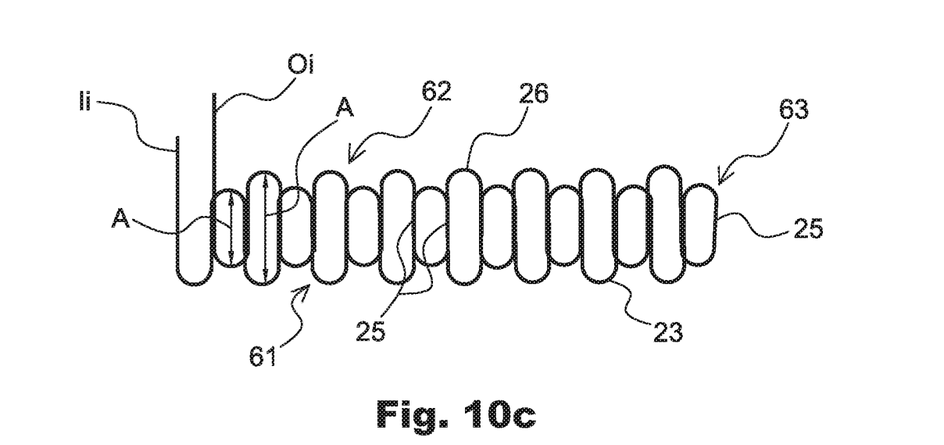

As it can be seen in FIGS. 8 and 10, each phase coil P1-P6 comprises a first part 61 having an input I1-I6 (one per phase coil) and a second part 62 having an output O1-O2 (one per phase coil). The inputs I1-I6 and the outputs O1-O6 are positioned at the same side of the wire assembly 44. The first part 61 and the second part 62 constitute a distributed wave winding.

More precisely, each part 61, 62 itself has a sinusoidal shape overall and comprises, consecutively, a lower end-loop portion 26 which extends below the lower lateral face 51 of the linear support 45, and a straight portion 25 which is received in an associated slot 48, and an upper end-loop portion 26 which extends above the upper lateral face 52 of the linear support 45.

In the present distributed wave winding, for two adjacent slots 48 associated with a phase coil P1-P6, the first part 61 comprises an end-loop portion 26 which connects the straight portions 25 received in the two adjacent slots 48 mentioned previously, and which is arranged axially above the axial upper lateral face of the linear support 45 (or of the core 11 when installed in the stator core 11); and the second part 62 comprises an end-loop portion 26 which connects the straight portions 25 received in the two adjacent slots 48 mentioned previously, and which is arranged axially below the lower lateral face of the (or of the core 11 when installed in the stator core 11).

Furthermore, each phase coil P1-P6 comprises a U-turn part 63 linking the first 61 and the second 62 parts so that each coil phase P1-P6 is composed of a single wire 23.

Figure 9:
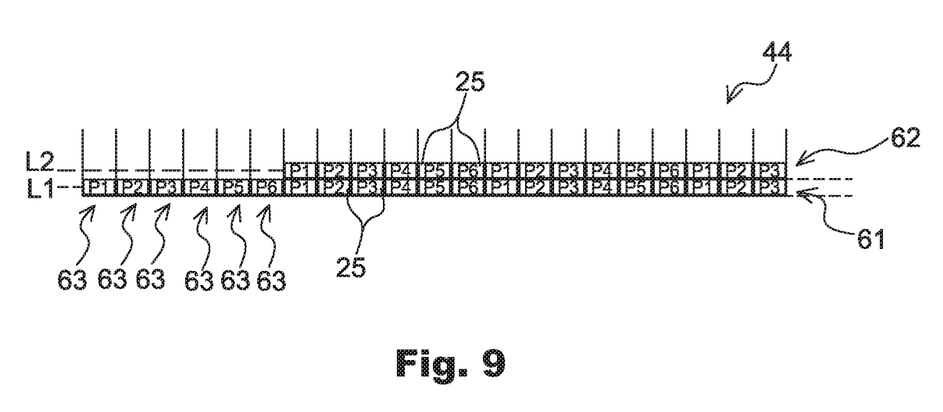
FIG. 9 is a linear development of the wires for all the phase coils of a six phases stator.

As it is clearly shown in FIG. 8 or 9, for each part 61, 62 of a phase coil P1-P6, the end-loop portions 26 link consecutive straight portions 25 which are positioned in the same layer L1-L2 of conductors. As a matter of fact, the straight portions 25 of the first parts 61 of the phase coils P1-P6 positioned in the bottom of the slots 48 define a first layer L1. The straight portions 25 of the second parts 62 of the phase coils P1-P6 positioned on the top of the straight portions 25 of the first parts 61 define a second layer L2. Thus, the wire assembly 44 of the linear support 45 comprises two layers L1, L2 of conductors.

As it can be seen in FIGS. 8 and 10a, in the first 61 and second 62 parts of each coil phase P1-P6, each straight portion 25 is linked via end-loop portions 26 to two adjacent straight portions 25 disposed on two opposite sides of the straight portion; ie on the right side and on the left side of a given straight portion 25.

In the U-turn part 63, a straight portion 25 is linked to two straight portions 25 positioned on the same side through end-loop portions 26. As a matter of fact, on FIG. 8, it is shown that the straight portion 25 belonging to the U-turn part 63 (located at the left side) is linked to two straight portions 25 located on the right side of the straight portion 25 of the U-turn through two different end-loop portions 26.

The U-turn part 63 is formed by turning around a last slot 48 (the slot 48 at the right side of a series of slots 48 on FIG. 7) for each phase coil P1-P6 and overlapping the straight portion 25 positioned inside the slot 48 preceding said last slot 48 by another straight portion 25.

As shown in FIGS. 10a and 10b, in the U-turn part 63, the straight portion 25 comprises a slope portion 64. The slope portion 64 is inclined in the thickness direction of the wire assembly 44. The straight portion 25 is preformed to have the slope portion 64 prior to installation of the wires onto the linear support 45.

The length of the wire assembly 44 is equal to N times the circumference of the stator, N being at least equal to two. As a consequence, for N=3, the stator will comprise 3*2=6 layers after the wire assembly 44 is round around the stator core 11 as it is explained hereafter.

Preferably, as it can be seen in FIG. 10c, there is a transversal offset between the first 61 and the second 62 parts of each phase coils. So the length A between the extremity of the end-loop segment 26 of the first part 61 and the corresponding extremity of the end-loop segment 26 of the second part 62 varies along the longitudinal direction of the wire assembly. The length A alternates a high and a low value.

Figure 11:
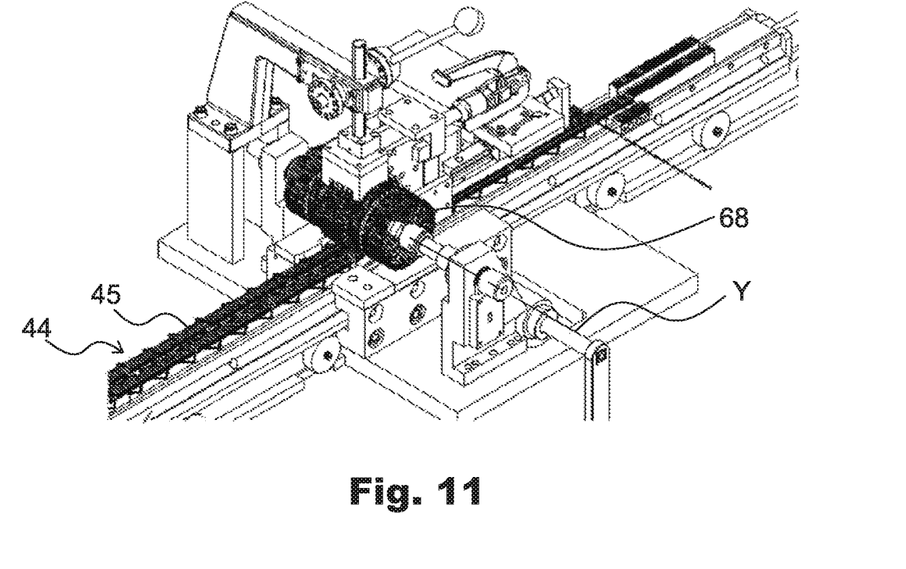
FIG. 11 is an illustration of an apparatus for implementing the step of transfer of the wire from the linear support to a cylindrical support.
Figure 12:
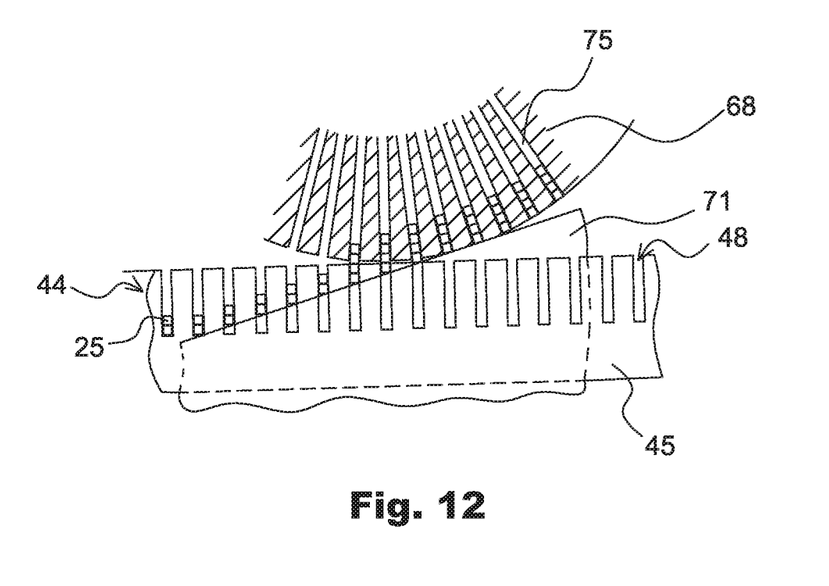
FIG. 12 is a detailed view of the apparatus illustrated in FIG. 11 showing the transfer of the wires by means of specific inclined guides.

As it can be seen in FIGS. 11 and 12, the wire assembly 44 is transferred from the linear support 45 to an annular support 68 in order to form the turns of the stator winding. To this end, the annular support 68 is mounted so that it can rotate around a transverse axis Y. While the annular support 68 is displaced relative to the linear support 45, two guides 71 cooperate with the corresponding longitudinal grooves 72 of the linear support 45 (cf. FIG. 6). Each guide 71 comprises an upper face in the form of a slope, the incline of which is determined such that each upper face is able to rest below the straight portions 25 of the coil phases P1-P6 so as to progressively draw the straight portions 25 to the top, for their transfer from a slot 48 of the linear support 45 to a corresponding slot 75 of the annular support 68.

Then, the method carries out the step of transferring the phase coils P1-P6 from the annular support 68 to the stator core 11. To this end, as it can be seen in FIGS. 13*a* and 13*b*, the core 11 is positioned around the annular support 68, so that the core 11 is received coaxially to the annular support 68.

Figure 13A:
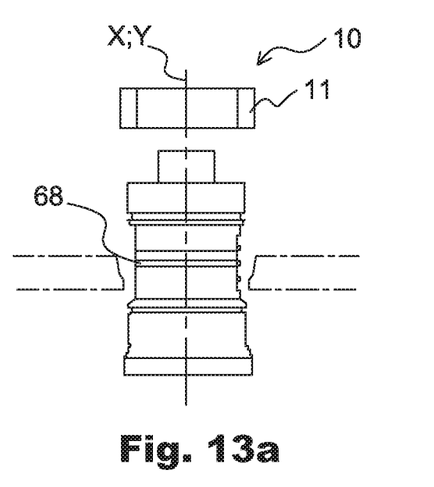
FIGS. 13a and 13b are side views of the apparatus for implementing the step of transfer of the phase coils from the cylindrical support to the stator core.
Figure 13B:
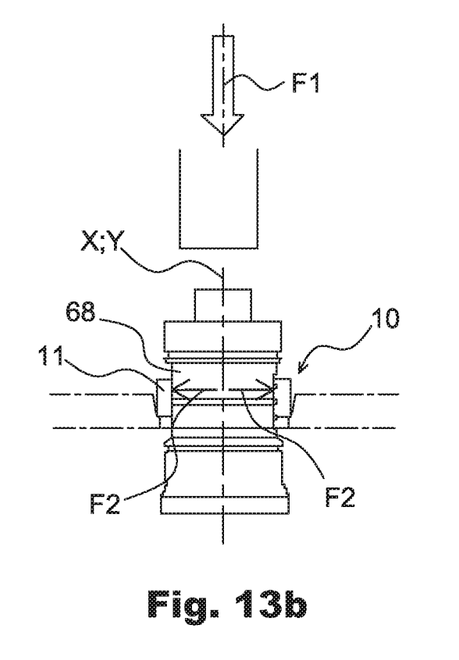

The external diameter of the annular support 68 is substantially equal to the internal diameter of the core 11. The apparatus may also comprise means of indexing the stator core 11 with regard to the annular support 68, so that each slot 75 of the annular support 68 opens out radially into the corresponding slot 18 of the stator core 11.

Figure 14A:
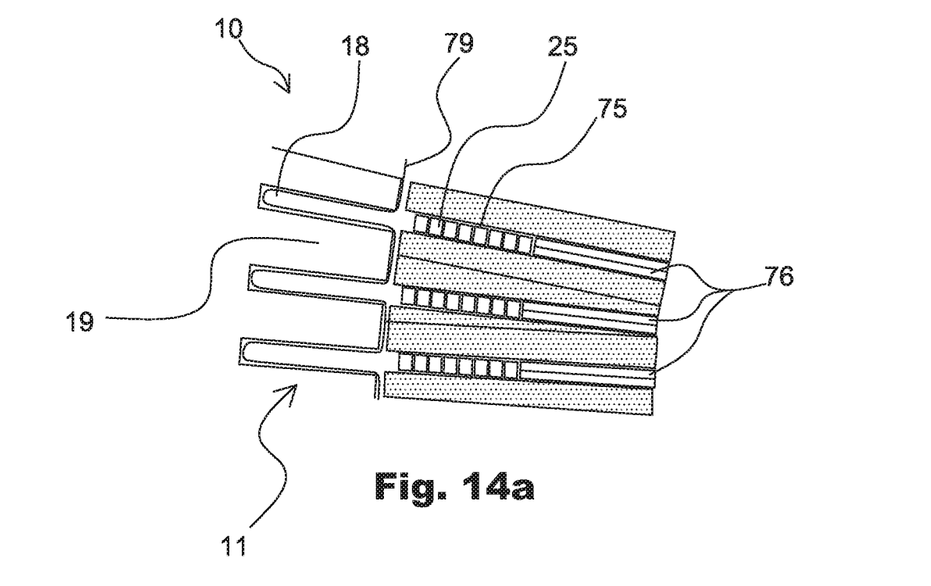
FIGS. 14a and 14b are more detailed views of the apparatus of FIGS. 13a and 13b having extraction blades shown respectively in the initial position and the final position for which the phase coils has been transferred onto the core of the stator.
Figure 14B:
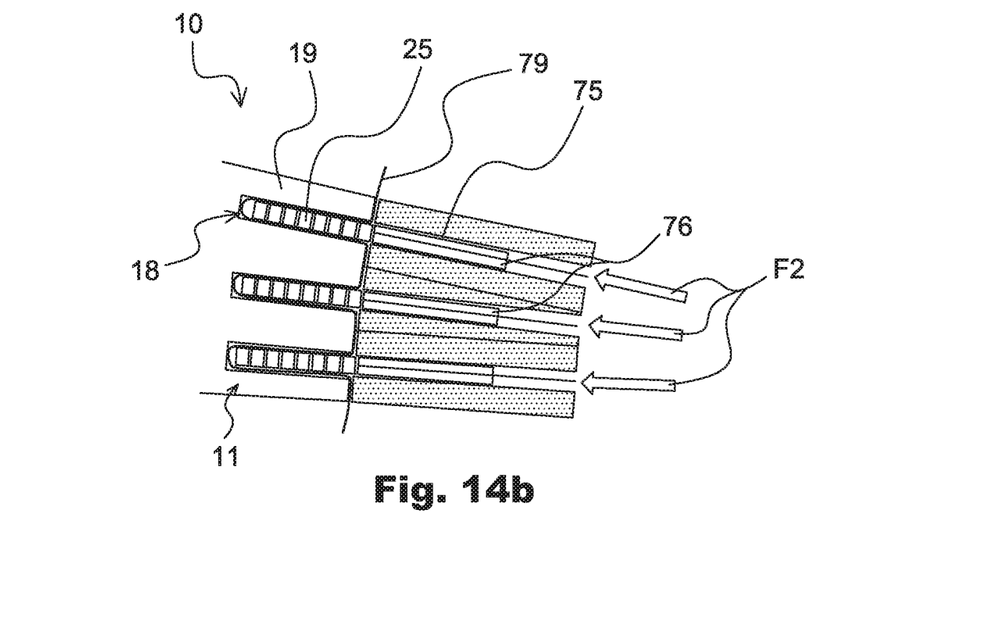

The apparatus comprises radial insertion blades 76 each of which extends in a radial plane relative to the principal axis Y of the annular support 68 and of the core 11. More precisely, as shown in FIG. 14*a*, at the start of the transfer step, each blade 76 is positioned radially, so that the edge of the external radial end of each blade 76 is positioned radially around the internal layer of conductors within the annular support 68.

During implementation of the step of transfer, the insertion blades 76 are pulled radially relative to the principal axis Y of the annular support 68, so that each blade 76 is displaced radially towards the exterior of the annular support 68, so that the straight portions 25 migrate into the slots 18 of the core 11, then forming the straight portions 25 of the stator winding. The displacement of the blades 76 is obtained by applying an axial effort following arrow F1 (cf. FIG. 13*b*) which is transformed by a mechanical system in a radial effort applied to the blades 76 following arrows F2.

Prior to the insertion of the phase coils P1-P6 into the slots of the core 11, an insulator 79 of the continuous type may be positioned inside the slots 18 of the core 11. The part of the insulator 79 extending between two consecutive slots may be removed by means of a cutting tool (not represented) after the insertion of the wire.

While the method herein described, and the form of the tools for carrying this method, constitute preferred embodiments, it is to be understood that the invention is not limited to this precise method and form of tools, and that changes may be made without departing from the scope of the invention, which is defined in the appended claims.

The invention claimed is:

1. A wire assembly (44) for an electric rotary machine comprising a plurality of phase coils (P1-P6),
   wherein each of the phase coils (P1-P6) is configured to be inserted in a dedicated set of slots (18) of a stator (10),
   wherein each of the phase coils (P1-P6) comprises:
   a first part (61) having an input (I1-I6);
   a second part (62) having an output (O1-O6), the first part (61) and the second part (62) constituting a distributed wave winding; and
   a U-turn part (63) linking the first part (61) and the second part (62) so that each of the phase coils (P1-P6) forms a single wire (23),
   wherein, in the U-turn part (63), the single wire (23) comprises a slope portion (64) inclined in a thickness direction of the wire assembly (44), and wherein the slope portion (64) overlaps the single wire (23) positioned inside one of the slots (18) when viewed in the thickness direction of the wire assembly (44).

2. The wire assembly according to claim 1, wherein the wire (23) of each of the phase coils (P1-P6) comprises:
   a plurality of straight portions (25) configured to be inserted into the slots (18) of the stator (10), and
   a plurality of end-loop portions (26) linking the straight portions (25),
   the end-loop portions (26) linking a plurality of consecutive straight portions (25) being positioned in a same layer (L1, L2) of conductors.

3. The wire assembly according to claim 2, wherein, in the first (61) and second (62) parts of each of the phase coils (P1-P6), a given straight portion (25) is linked to two adjacent straight portions (25) disposed on two opposite sides of the given straight portion (25).

4. The wire assembly according to claim 2, wherein, in the U-turn part (63), one of the straight portions portion (25) is linked to two of the straight portions (25) positioned on the same side through the end-loop portions (26).

5. The wire assembly according to claim 2, wherein, in the U-turn part (63), the straight portion (25) comprises the slope portion (64).

6. The wire assembly according to claim 1, wherein, in the first (61) and second (62) parts of each of the phase coils (P1-P6), a given straight portion (25) is linked to two adjacent straight portions (25) disposed on two opposite sides of the given straight portion (25).

7. The wire assembly according to claim 6, wherein, in the U-turn part (63), a straight portion (25) is linked to two straight portions (25) positioned on the same side through end-loop portions (26).

8. The wire assembly according to claim 6, wherein, in the U-turn part (63), the straight portion (25) comprises the slope portion (64).

9. The wire assembly according to claim 1, wherein, in the U-turn part (63), a straight portion (25) is linked to two straight portions (25) positioned on the same side through end-loop portions (26).

10. The wire assembly according to claim 4, wherein, in the U-turn part (63), the straight portion (25) comprises the slope portion (64).

11. The wire assembly according to claim 1, wherein the wire (23) of each of the phase coils (P1-P6) comprises a plurality of straight portions (25) configured to be inserted into the slots (18) of the stator (10), and wherein, in the U-turn part (63), the straight portion (25) comprises the slope portion (64).

12. The wire assembly according to claim 1, wherein a length of the wire assembly (44) is equal to N times the circumference of the stator (10), and wherein N is at least equal to two.

13. The wire assembly according to claim 1, wherein there is a transversal offset between the first (61) and the second (62) parts of each of the phase coils (P1-P6).

* * * * *